United States Patent
Smith et al.

(10) Patent No.: US 11,379,103 B2
(45) Date of Patent: Jul. 5, 2022

(54) GENERATING AND SHARING CONTEXTUAL CONTENT ITEMS BASED ON PERMISSIONS

(71) Applicant: Meta Platforms, Inc., Menlo Park, CA (US)

(72) Inventors: Eric Stephen Smith, Redwood City, CA (US); Joshua Barton Dickens, Oakland, CA (US); Christine Choi, San Francisco, CA (US); Hyun Woo Jung, Burlingame, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/949,422

(22) Filed: Oct. 29, 2020

(65) Prior Publication Data

US 2021/0042021 A1    Feb. 11, 2021

Related U.S. Application Data

(63) Continuation of application No. 15/858,171, filed on Dec. 29, 2017, now abandoned.

(51) Int. Cl.
| | | |
|---|---|---|
| *G06F 3/04845* | (2022.01) | |
| *G06T 11/60* | (2006.01) | |
| *G06F 3/0482* | (2013.01) | |
| *G06Q 50/00* | (2012.01) | |
| *G06Q 30/06* | (2012.01) | |
| *G06F 3/04883* | (2022.01) | |

(Continued)

(52) U.S. Cl.
CPC ........ *G06F 3/04845* (2013.01); *G06F 3/0482* (2013.01); *G06F 3/04883* (2013.01); *G06Q 30/06* (2013.01); *G06Q 50/01* (2013.01); *G06T 11/60* (2013.01); *G06T 2200/24* (2013.01); *H04L 67/10* (2013.01); *H04N 5/23216* (2013.01); *H04N 5/23293* (2013.01)

(58) Field of Classification Search
CPC .... G06Q 50/01; G06Q 30/06; G06F 3/04845; G06F 3/04883; G06F 3/0482; G06T 11/60; G06T 2200/24; H04N 5/23293; H04N 5/23216; H04N 5/23229; H04L 67/10

See application file for complete search history.

(56) References Cited

U.S. PATENT DOCUMENTS

| | | |
|---|---|---|
| 9,230,355 B1 | 1/2016 | Ahuja et al. |
| 2013/0268357 A1 | 10/2013 | Heath |

(Continued)

FOREIGN PATENT DOCUMENTS

| | | | | |
|---|---|---|---|---|
| CA | 2765538 A1 * | 12/2010 | ............... | G06T 7/12 |
| WO | WO-2016030879 A1 * | 3/2016 | ........... | G06Q 10/101 |

OTHER PUBLICATIONS

Smith E., et al., "Systems and Methods for Generating and Sharing Content," Final Office Action dated Sep. 8, 2020 for U.S. Appl. No. 15/858,171, filed Dec. 29, 2017, 14 pages.

*Primary Examiner* — Amy M Levy
(74) *Attorney, Agent, or Firm* — Lee & Hayes, P.C.

(57) ABSTRACT

Systems, methods, and non-transitory computer-readable media can receive a first contextual content item created by a first user. A user input is received from a second user indicating an intent to acquire the first contextual content item. The second user is provided with access to utilize the first contextual content item.

20 Claims, 18 Drawing Sheets

(51) Int. Cl.
　　　*H04L 67/10*　　　(2022.01)
　　　*H04N 5/232*　　　(2006.01)

(56) References Cited

U.S. PATENT DOCUMENTS

| | | | |
|---|---|---|---|
| 2014/0032546 A1* | 1/2014 | Lee | H04N 1/32128 |
| | | | 707/734 |
| 2015/0222617 A1 | 8/2015 | Ebersman et al. | |
| 2015/0243062 A1* | 8/2015 | Tyson | H04N 1/00198 |
| | | | 348/207.11 |
| 2016/0196052 A1* | 7/2016 | Franklin | G06F 3/0481 |
| | | | 715/765 |
| 2016/0196584 A1* | 7/2016 | Franklin | G06F 3/04845 |
| | | | 705/14.64 |
| 2016/0212201 A1 | 7/2016 | Munemann | |
| 2016/0240010 A1* | 8/2016 | Rosenthal | G06V 20/30 |
| 2016/0284112 A1 | 9/2016 | Greenberg et al. | |
| 2016/0334972 A1 | 11/2016 | Cheng et al. | |
| 2016/0350953 A1* | 12/2016 | Mittelstaedt | G06T 11/60 |
| 2017/0192651 A1 | 7/2017 | Yang et al. | |
| 2017/0359701 A1* | 12/2017 | Sarma | H04L 51/063 |
| 2018/0068475 A1 | 3/2018 | Blue et al. | |
| 2018/0164986 A1* | 6/2018 | Al Majid | G06T 11/60 |
| 2018/0182149 A1 | 6/2018 | Chong et al. | |

\* cited by examiner

GENERATING AND SHARING CONTEXTUAL CONTENT ITEMS BASED ON PERMISSIONS

CROSS-REFERENCE TO RELATED APPLICATION(S)

This application is a continuation of and claims priority to U.S. patent application Ser. No. 15/858,171, filed on Dec. 29, 2017 and entitled "SYSTEMS AND METHODS FOR GENERATING AND SHARING CONTENT" which is incorporated by reference herein in its entirety.

FIELD OF THE INVENTION

The present technology relates to the field of content sharing. More particularly, the present technology relates to techniques for creating and sharing digital content in a computer networking environment.

BACKGROUND

Users often utilize computing devices for a wide variety of purposes. Users can use their computing devices to, for example, interact with one another, access media content, share media content, and create media content. In some cases, media content can be provided by members of a social networking system. The media content can include one or a combination of text, images, videos, and audio. The media content may be published to the social networking system for consumption by others.

SUMMARY

Various embodiments of the present disclosure can include systems, methods, and non-transitory computer readable media configured to receive a first contextual content item created by a first user. A user input is received from a second user indicating an intent to acquire the first contextual content item. The second user is provided with access to utilize the first contextual content item.

In an embodiment, the first contextual content item is provided for presentation to the second user.

In an embodiment, the first contextual content item is presented as part of an embellished content item comprising a primary content item and the first contextual content item.

In an embodiment, the receiving the user input from the second user comprises receiving the user input from the second user during presentation of the embellished content item to the second user.

In an embodiment, the providing the second user with access to utilize the first contextual content item comprises adding the first contextual content item to a set of contextual content items associated with the second user.

In an embodiment, the providing the second user with access to utilize the first contextual content item comprises adding the first contextual content item to a sticker tray associated with the second user.

In an embodiment, a selection of a primary content item is received from the second user.

In an embodiment, a selection is received from the second user selecting the first contextual content item from a plurality of contextual content items.

In an embodiment, the first contextual content item is applied to the primary content item based on the selection of the first contextual content item from the plurality of contextual content items.

In an embodiment, the providing the second user with access to utilize the first contextual content item is performed based on a determination that permissions settings associated with the first contextual content item permit the second user to utilize the first contextual content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
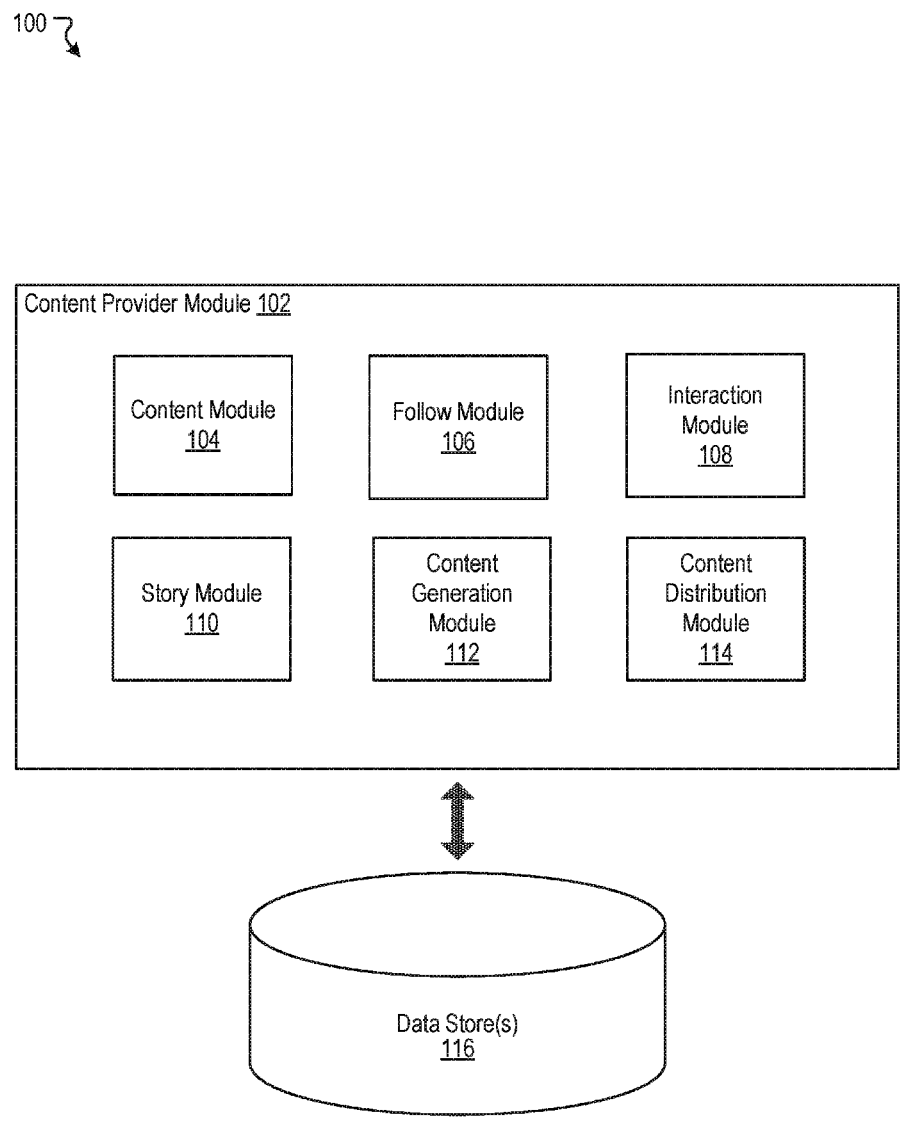
FIG. 1 illustrates an example system including a content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Generating and Sharing Content

As mentioned, users often utilize computing devices for a wide variety of purposes. Users can use their computing devices to, for example, interact with one another, access media content, share media content, and create media content. In some cases, media content items can include postings from members of an online community or platform, such as a social networking system. The postings may include one or a combination of text, images, videos, and audio. The postings may be published to the social networking system for consumption by others. Under conventional approaches, media content items posted by a member can be included in a profile of the member on the social networking system. In other instances, media content items posted by the member can appear in respective media content feeds of other users who are members of the social networking system. The other users can be connections of the member who posted the media content items.

Under conventional approaches, users can create and publish content to a social networking system. Such posted content can include text, media (e.g., images, videos, audio), or a combination thereof. Other users can access the published content through the social networking system. Under conventional approaches, users may be provided with various features or tools to generate content. For example, these features and/or tools may be provided via a user interface on a mobile application or web browser. Users can interact with the user interface to generate content and publish it to the social networking system. However, conventional approaches for generating and sharing media content items can be burdensome for various reasons. For example, users may be limited to certain pre-made or pre-selected features or options in generating their media content items. Users may prefer to create media content items that are more expressive than what would typically be possible with the pre-generated features and options.

An improved approach rooted in computer technology overcomes the foregoing and other disadvantages associated with conventional approaches specifically arising in the realm of computer technology. In general, users may be provided with tools and/or features to create embellished content items. Embellished content items can be media content items which include both a primary content item and one or more contextual content items. The primary content item can include a media content item, such as an image or a video. A contextual content item can modify and/or embellish the primary content item. For example, contextual content items may modify a visual aspect of the primary content item. Examples of contextual content items include stickers than can be overlaid on the primary content item, one or more masks, frames, filters, and/or other visual effects that can be applied to the primary content item, and the like. In various embodiments, users may be provided with tools and/or features for creating their own contextual content items. Furthermore, in various embodiments, users may be provided with tools and/or features for sharing contextual content items with other users as well as accessing and using contextual content items created by other users. More details relating to the disclosed technology are provided below.

FIG. 1 illustrates an example system 100 including a content provider module 102, according to an embodiment of the present disclosure. The content provider module 102 can provide tools within a user interface with which a user can create one or more contextual content items. For example, the user can create one or more contextual content items using a camera tool and/or a drawing tool. The user interface can also include tools for the user to create and publish an embellished content item which comprises a primary content item and one or more contextual content items. The content provider module 102 can also provide tools within a user interface with which a user can view and access contextual content items created by other users. The second user can apply contextual content items created by other users to create his or her own embellished content items.

As shown in the example of FIG. 1, the content provider module 102 can include a content module 104, a follow module 106, an interaction module 108, a story module 110, a content generation module 112, and a content distribution module 114. In some instances, the example system 100 can include at least one data store 116. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 116, as shown in the example system 100. The data store 116 can be configured to store and maintain various types of data. In some implementations, the data store 116 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 116 can store information that is utilized by the content provider module 102. For example, the data store 116 can store various embellished content items, contextual content items, including one or more user-generated contextual content items, user preferences with regard to sharing and/or publication of contextual content items, and the like. It is contemplated that there can be many variations or other possibilities.

The content module 104 can be configured to provide users with access to content (e.g., media content items) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. The first user can also interact with the interface to post media content items to the social networking system. Such media content items may include text, images, audio, and videos, to name some examples. For example, the first user can submit a post to be published through the social networking system. In some embodiments, the post can include, or reference, one or more media content items.

In various embodiments, other users of the social networking system can access media content items posted by the first user. In one example, the other users can access the media content items by searching for the first user by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that media content items posted by the first user are no longer included in the content feed of the user.

In some instances, users may want to interact with posted media content items. For example, a user may want to endorse, or "like", a media content item. In this example, the user can select an option provided in the interface to like the desired media content item. The interaction module 108 can determine when a user likes a given media content item and can store information describing this relationship. The interaction module 108 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 108 can determine when a user posts a comment in response to a given media content item and can store information describing this relationship. Other forms of user interaction can include emoji-based reactions to a media content item (e.g., selecting an option that corresponds to a particular reaction emoji, e.g., happy, sad, angry, etc.) and re-sharing a media content item, for example.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., every 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the content generation module 112 is used to create media content items. Media content items created by the content generation module 112 can include primary content items, contextual content items, and/or embellished content items. More details regarding the content generation module 112 will be provided below with reference to FIG. 2A.

In various embodiments, the content distribution module 114 is used to distribute media content items through a social networking system. Media content items distributed by the content distribution module 114 can include primary content items, contextual content items, and/or embellished content items. More details regarding the content distribution module 114 will be provided below with reference to FIG. 2B.

Figure 2A:
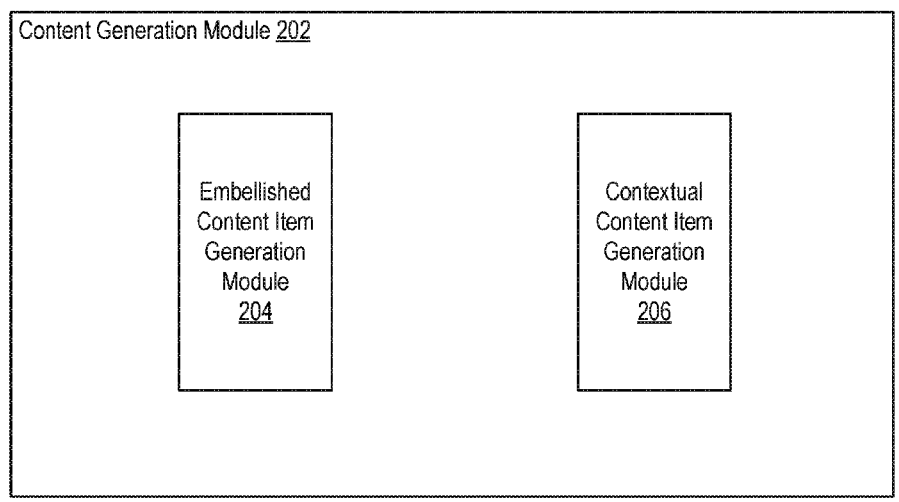
FIG. 2A illustrates an example content generation module, according to an embodiment of the present disclosure.

FIG. 2A illustrates an example content generation module 202 configured to generate media content items, according to an embodiment of the present disclosure. In some embodiments, the content generation module 112 of FIG. 1 can be implemented as the content generation module 202. As shown in the example of FIG. 2A, the content generation module 202 can include an embellished content item generation module 204 and a contextual content item generation module 206.

The embellished content item generation module 204 can be configured to provide a user interface within which a user can create an embellished content item. As discussed above, an embellished content item can comprise a primary content item and one or more contextual content items. The primary content item can be a media content item, such as an image or a video. A contextual content item can be a media content item that embellishes and/or modifies another media content item (i.e., the primary content item). Examples of contextual content items can include stickers that can be overlaid on a primary content item, frames that can be applied to a primary content item, filters that can be applied to a primary content item, masks that can be applied to a primary content item (e.g., to modify an appearance of one or more faces detected in the primary content item), or other visual effects that can be applied to a primary content item to modify various visual characteristics of the primary content item.

The embellished content item generation module 204 can be configured to receive a user selection of a primary content item. In various embodiments, a user can select a primary content item from a set of available content items. For example, the user can select a primary content item from a camera roll that is stored locally on the user's computing device or that is accessible over a network. In certain embodiments, a user can select a primary content item by capturing a new content item using a camera interface. The camera interface can include, for example, a viewfinder display that provides a real-time display of image content reflecting subject matter at which a camera (e.g., a camera on the user's computing device) is pointed. The camera interface can also include a shutter button. When the user clicks the shutter button, the embellished content item generation module 204 can capture image content displayed in the viewfinder display (e.g., an image or a video) and use the captured image content as the primary content item.

Once a primary content item has been selected, a user can modify and/or embellish the primary content item using one or more contextual content items. The embellished content item generation module 204 can provide a content modification interface that a user can use to apply one or more modifications to a primary content item. For example, the content modification interface can provide a user with tools to apply one or more filters, frames, masks, or other visual effects to the primary content item. In another example, the content modification interface can provide a user with tools to draw on the primary content item. In yet another example, the content modification interface can provide a user with tools to add one or more stickers to the primary content item. Various stickers can be presented within a sticker tray in the content modification interface.

The contextual content item generation module 206 can provide various tools for a user to create his or her own contextual content items. In one embodiment, the contextual content item generation module 206 can provide tools within a content modification interface. The content modification interface can include one or more pre-defined contextual content items to apply to the primary content item. For example, the content modification interface can include one or more pre-defined stickers, frames, masks, filters, etc. The content modification interface can also provide users with tools to create their own contextual content items.

In one embodiment, the contextual content item generation module 206 can provide a drawing tool for creating a contextual content item by drawing. For example, the drawing tool can provide various options that the user can select to draw an image. Such options might include various brushes, brush widths, shapes, colors, and the like. The drawn image can then be saved as a contextual content item. For example, the image can be saved as a sticker, frame, or mask that can be applied to a primary content item. The drawing tool may be provided within the context of the content modification interface. For example, the content modification interface may present a primary content item selected by the user, and the user can draw on the primary content item. The user can then be provided with an option to save the drawing as a contextual content item that can be used later on, for example, to modify a different primary content item and/or to be shared with other users so that the other users can apply the contextual content item to other primary content items.

In another embodiment, the contextual content item generation module 206 can provide a camera tool for creating a contextual content item using a camera. For example, the camera tool can allow a user to create one or more stickers, frames, filters, and/or masks based on image content captured using a camera. In one embodiment, the user can access the camera tool within a sticker tray that is provided as part of the content modification interface. The sticker tray can comprise a plurality of sticker options that can be applied to a primary content item. When the user selects the camera tool from the sticker tray, a camera sticker capture interface can be overlaid on a primary content item. The camera sticker capture interface can comprise a camera viewfinder window and a shutter button. The camera viewfinder window can provide image content reflecting subject matter at which a camera (e.g., a camera on the user's computing device) is pointed. The shutter button can allow the user to capture the image being displayed within the camera viewfinder window at the moment the user taps the shutter button. Capture of the displayed image in this way generates a camera sticker. Once the user has captured and created a camera sticker, the user can be provided with the ability to save the camera sticker. Once saved, the captured camera sticker can be saved in the sticker tray such that it can be applied to other primary content items in the future.

The camera tool can provide a user with the ability to modify and/or interact with the camera viewfinder window and thus a resulting camera sticker in various ways. In various embodiments, the camera tool can provide various camera sticker styles that modify one or more visual aspects of the camera sticker. A user can toggle through the various camera sticker styles by using a first type of interaction (e.g., by tapping on the camera viewfinder window). In certain embodiments, various styles may be associated with various frames for the camera sticker. For example, a first style can include a circular frame, a second style can include a square frame, a third style can include blurred vignette frame, a fourth style can include an ornate mirror-style frame, etc. In certain embodiments, various styles may be associated with various zoom or crop-levels. For example, one or more styles may cause the image content displayed in the camera viewfinder display to be zoomed out so as to present substantially all image content received by a camera, while other styles may cause various levels of zooming and/or cropping. In certain embodiments, certain styles may adjust zooming, cropping, placement, and/or centering of the image content presented within the camera viewfinder window based on various objects detected within the image content. For example, if it is determined that image content received by a camera includes a face, certain styles may, based on detection of the face, zoom in on the face such that the face or a portion of the face fills the camera viewfinder window.

In addition to selection of a style from a plurality of styles, the camera tool may allow a user to perform other operations and/or interactions with respect to a camera sticker. For example, the user can select between a front-facing camera and a rear-facing camera for the camera sticker. In another example, the user can rotate the camera sticker (e.g., using a two-fingered rotation gesture on a touch screen), or change the size of the camera sticker (e.g., using a pinching or spreading gesture), or change a position of the camera sticker on the primary content item (e.g., using a dragging gesture). Certain of these operations can be performed only before capture of the camera sticker (i.e., before selection of the shutter button), while other operations can be performed either before or after capture of the camera sticker. For example, toggling between a front or rear-facing camera can be performed before capture of the camera sticker, while selection of a style, or changing rotation, size or position of a camera sticker can be performed either before or after capture of the camera sticker. Numerous variations are possible.

Users can combine different tools to create contextual content items. For example, a user can capture a camera sticker using a camera tool, and then draw on the camera sticker using the drawing tool. The camera sticker with added drawings can be saved as a contextual content item.

When a user creates a contextual content item, the contextual content item generation module 206 can be configured to receive permissions settings for the contextual content item. For example, the user can choose to keep the contextual content item private. In such a case, other users may be able to view the contextual content item if the user publishes an embellished content item that utilizes the contextual content item. However, other users may not be able to otherwise utilize the contextual content item in their own embellished content items. In another example, the user can choose to make the contextual content item available to a subset of users such that the subset of users can access the contextual content item and use it in creating their own embellished content items. In yet another example, the user can choose to make the contextual content item available to all other users on a social networking system. When a user creates a contextual content item, the contextual content item can include attribution information indicating that the user created the contextual content item, even as the contextual content item is acquired and used by other users.

Figure 2B:
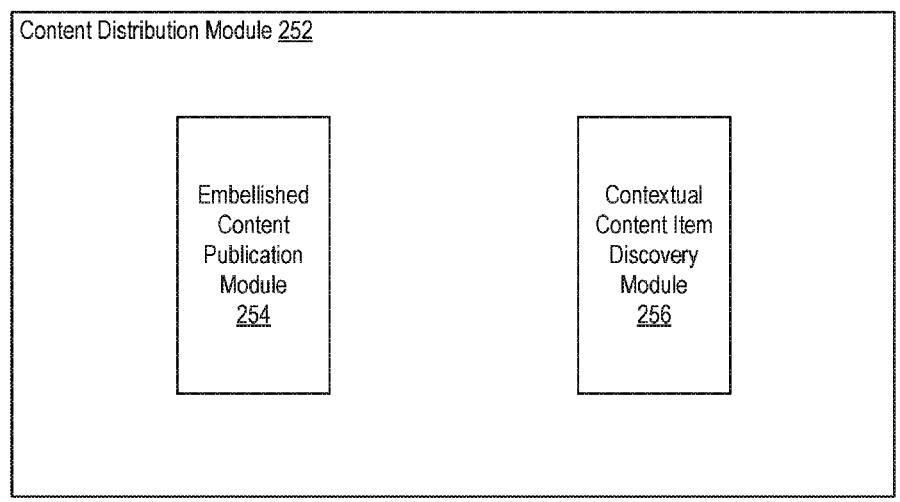
FIG. 2B illustrates an example content distribution module, according to an embodiment of the present disclosure.

FIG. 2B illustrates an example content distribution module 252 configured to distribute media content items, according to an embodiment of the present disclosure. In some embodiments, the content distribution module 114 of FIG. 1 can be implemented as the content distribution module 252. As shown in the example of FIG. 2B, the content distribution module 252 can include an embellished content publication module 254 and a contextual content item discovery module 256.

The embellished content publication module 254 can be configured to post (i.e., publish) media content items, for example, to a social networking system. In some embodiments, users have an option to share media content items as stories in a story feed or in one or more other content feeds. In some embodiments, content included in a user's story feed is treated as ephemeral content. That is, content included in the story feed can be available to other users (e.g., followers of the user) for a shortened duration of time, i.e., the content is temporarily available. In some embodiments, content included in other content feeds may be treated as non-ephemeral content. That is, the content can be available to the other users for some longer or indefinite duration of time. These time periods can be pre-defined by the social networking system or, in some embodiments, by the user posting the media content item. In some embodiments, a media content item posted in a non-ephemeral content feed can be available through the social networking system until the media content item is deleted by the user. As described above, an embellished content item can include a primary content item and one or more contextual content items applied to the primary content item. In various embodiments, when a user posts and/or publishes an embellished content item, multiple content items contained in the embellished content item may be flattened into a single media content item, such as an image or a video. For example, a primary content item and one or more contextual content items applied to the primary content item may be flattened into a single image or video. In other embodiments, the embellished content item may be published and maintain the primary content item and any contextual content items as distinct content items contained within the embellished content item.

In various embodiments, the embellished content publication module 254 may allow viewing users of an embellished content item to acquire one or more contextual content items contained within the embellished content item. For example, if an embellished content item is published to a user's story feed, or is published as a post in a non-ephemeral content feed, a viewing user viewing the published embellished content item may be presented with the option to select and acquire one or more contextual content items contained in the embellished content item. In one example, if a viewing user sees a contextual content item they would like to acquire, the viewing user can select (e.g., tap on) the contextual content item in order to be presented with the option to add the contextual content item to his or her own collection of contextual content items (e.g., a selected sticker can be added to the user's sticker tray).

In certain embodiments, the embellished content publication module 254 can be configured to enforce permissions settings associated with a contextual content item. For example, if a user selects a contextual content item, but permissions settings associated with the contextual content item indicate that the user is not authorized to acquire the contextual content item, the user may not be presented with the option to add the contextual content item to his or her collection. Conversely, if the user is authorized to acquire the contextual content item, the user can be presented with the option to acquire the contextual content item.

The contextual content item discovery module 256 can be configured to provide users with various ways to explore and acquire contextual content items created by other users. As discussed above, the embellished content publication module 254 can allow users to discover and acquire contextual content items in the context of published embellished content items containing those contextual content items. The contextual content item discovery module 256 may provide other and/or additional options for discovering and acquiring contextual content items. For example, the contextual content item discovery module 256 can provide a search platform for users to search for contextual content items created by other users. Users may be able to search by user ID (e.g., to find contextual content items created by a particular user). In certain embodiments, users can perform keyword searches to identify contextual content items relevant to entered search terms. When a user discovers and acquires a contextual content item, the user can be provided with access to the contextual content item. For example, the contextual content item may be added to a set of contextual content items (e.g., a collection of content items) associated with the user. In one instance, the contextual content item may be provided to the user within a content modification interface along with other contextual content items associated with the user so that the user can modify a primary content item using the acquired contextual content item.

Figure 3A:
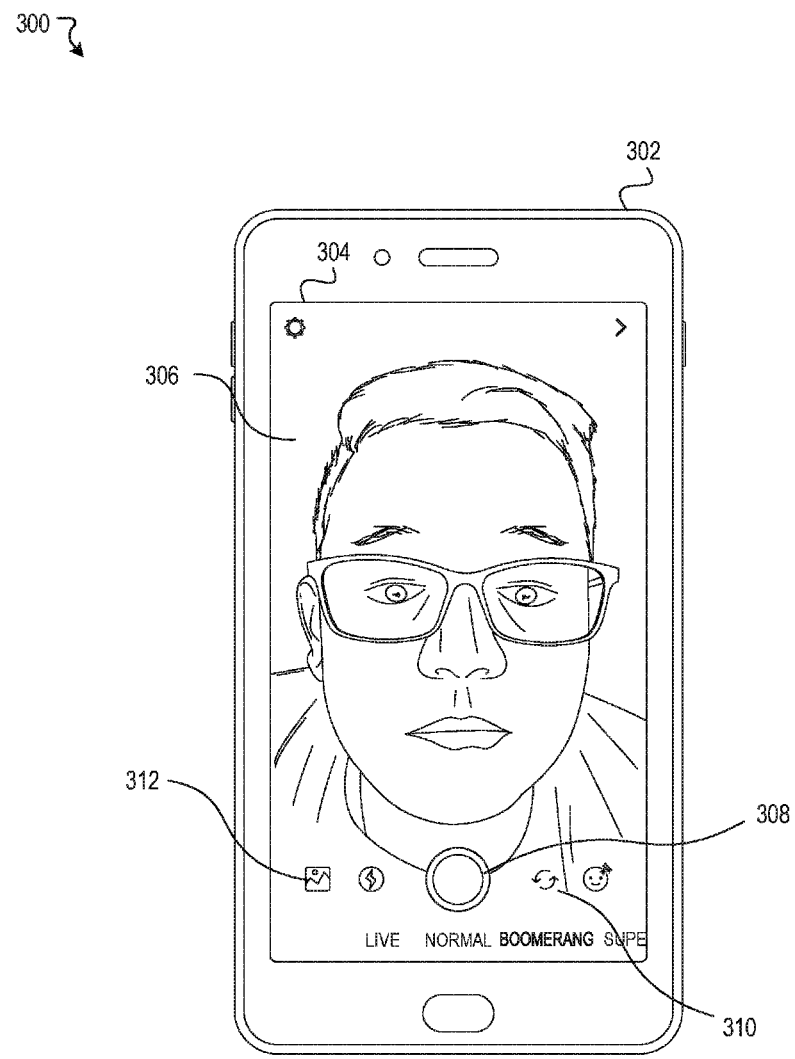
FIGS. 3A-3I illustrate example user interfaces associated with generating content items, according to an embodiment of the present disclosure.

FIG. 3A illustrates an example scenario 300 associated with generating media content items, according to an embodiment of the present disclosure. The example scenario 300 includes an interface 304 that is presented through a display screen of a computing device 302. In various embodiments, the interface 304 may be provided through an application (e.g., a web browser, a social networking application, messenger application, etc.) running on the computing device 302 that is configured to interact with a social networking system.

In FIG. 3A, the interface 304 displays a camera interface that allows a user to capture a primary content item. The interface 304 includes a viewfinder display 306 and a shutter button 308. The viewfinder display 306 displays image data (i.e., image content) via a camera on the computing device 302. The user can select a camera toggle icon 310 to toggle between a front facing camera and a rear-facing camera on the computing device 302. Rather than capturing a new content item, the user can also select a primary content item from a camera roll by selecting a camera roll icon 312.

Figure 3B:
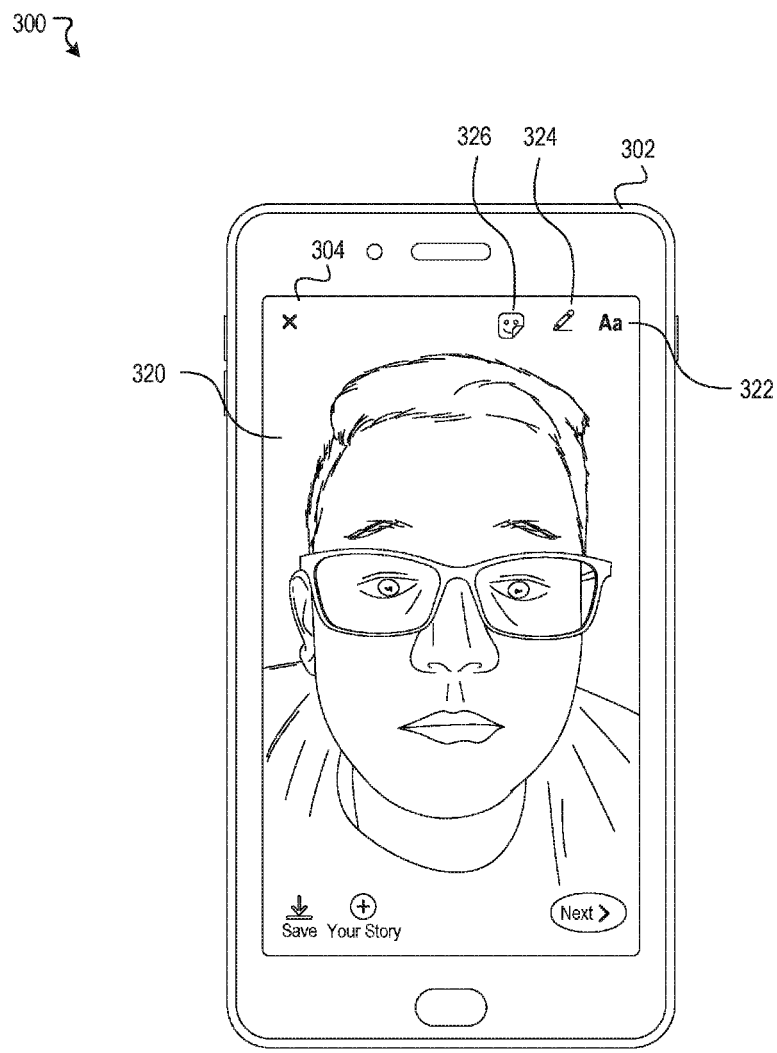
Figure 3C:
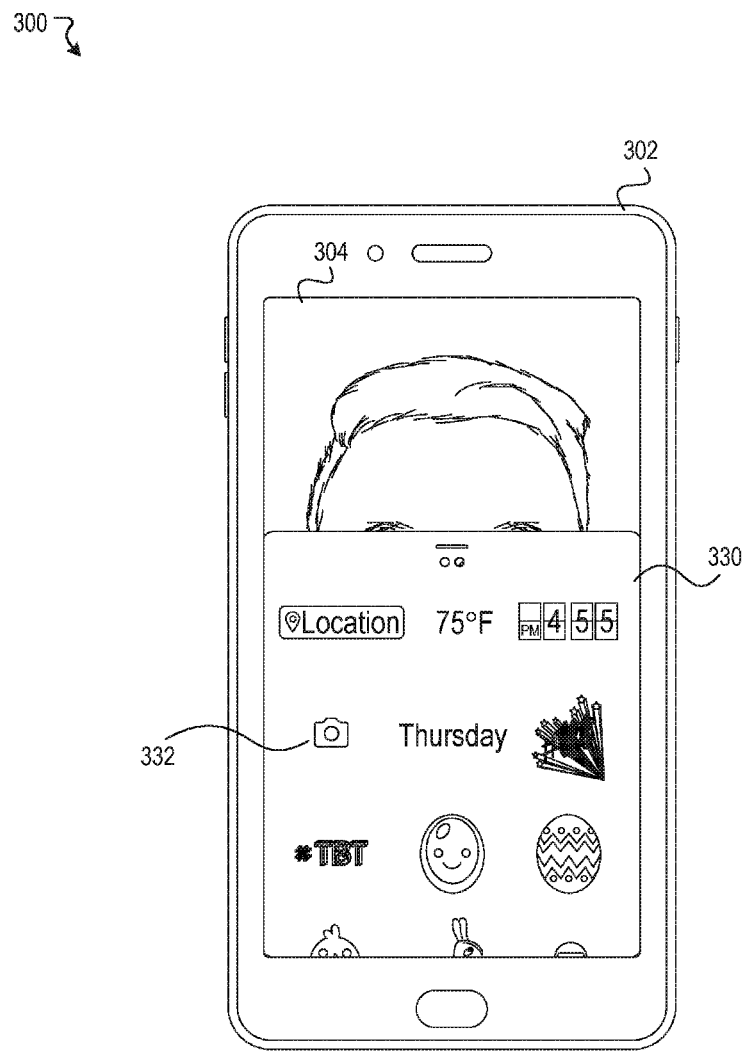

Once the user has selected a primary content item (e.g., by clicking the shutter button 308), the user can be presented with a content modification interface, as illustrated in the example of FIG. 3B. In this example, the user has captured a primary content item 320, i.e., an image of a user's face. The content modification interface provides a user with various options to modify and/or embellish the primary content item 320. For example, the user can select a text option 322 to add a textual overlay to the primary content item 320. In another example, the user can select a draw option 324 that allows the user to draw on the primary content item 320. In yet another example, the user can select a sticker option 326 to add one or more stickers to be overlaid on the primary content item 320. Selecting the sticker option 326 opens a sticker tray 330 from which a user can select a sticker to overlay on the primary content item 320, as illustrated in the example of FIG. 3C. The sticker tray 330 can include a camera sticker option 332 for adding a camera sticker to the primary content item 320. Selecting the camera sticker option 332 can open up a camera tool with which a user can create his or her own contextual content item (e.g., capture a camera sticker).

Figure 3D:
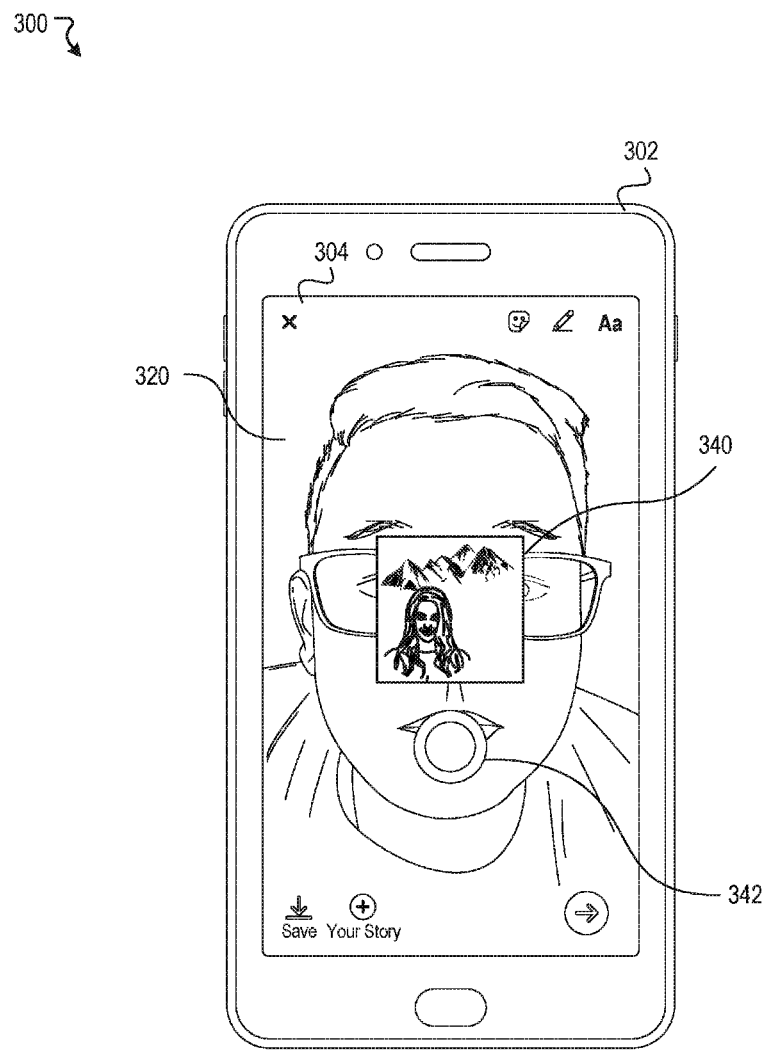

In FIG. 3D, the user has selected the camera sticker option 332, resulting in a camera sticker capture interface being overlaid on the primary content item 320. The camera sticker capture interface comprises a camera viewfinder window 340 and a shutter button 342. The camera viewfinder window 340 presents image data being received by a camera on the user's computing device 302. In this example, the camera viewfinder window 340 presents a user standing in front of a mountain range. The shutter button 342 allows the user to capture the image data presented in the camera viewfinder window 340, which is then used for or as the contextual content item, i.e., a camera sticker. In other words, the shutter button 342 is used to capture the camera sticker.

Figure 3E:
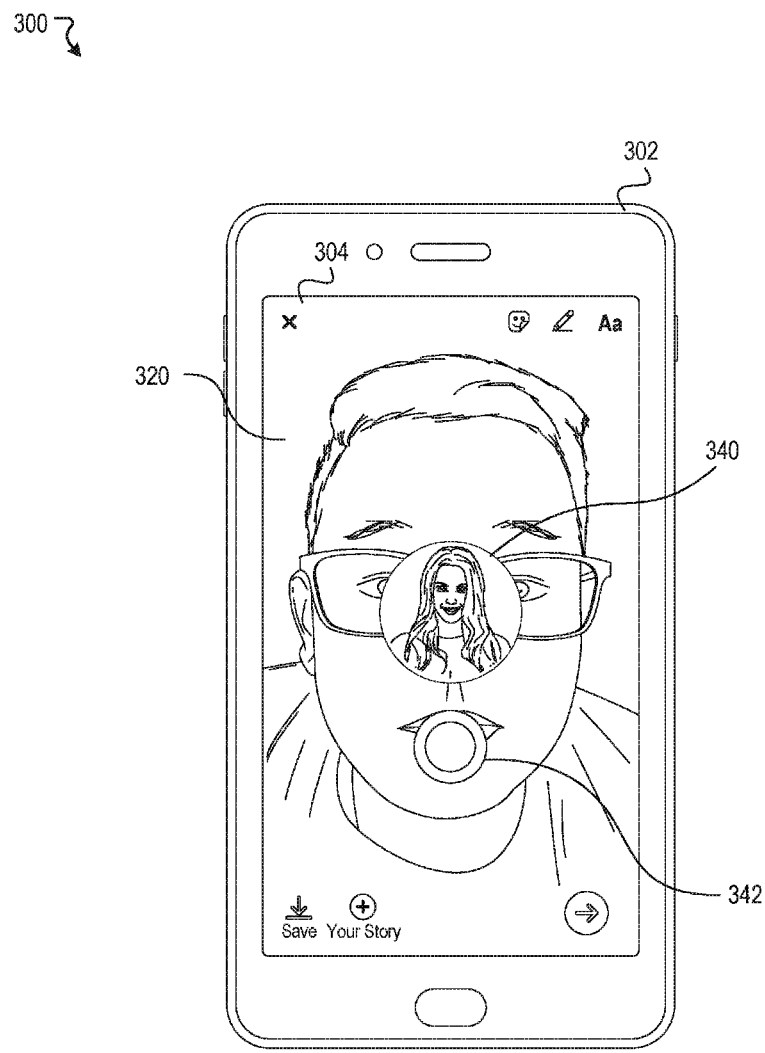

As discussed above, the camera tool may provide a user with a plurality of style options for the camera sticker. Each style may be associated with a particular set of visual characteristics for the camera sticker. The camera viewfinder window 340 may provide a preview of a current style that is being applied. For example, in the example of FIG. 3D, the camera viewfinder window 340 is depicted with a square frame with a zoomed out view of the user and the mountain range. In FIG. 3E, the user has provided a user input to change a style of the camera sticker (e.g., tapping on the camera viewfinder window 340). In the example illustrated in FIG. 3E, the frame has changed from the square frame shown in FIG. 3D to a circular frame. The zoom level (and/or crop level) of the viewfinder has also changed such that the camera viewfinder window 340 depicts a zoomed-in view of the user's face. Furthermore, placement and/or centering of the image content within the viewfinder has been adjusted. For example, the placement and/or centering of the image content within the viewfinder may be modified based on detection of one or more objects in the image content, such as the user's face. In the example illustrated in FIG. 3E, the placement and/or centering of the image data has been modified such that the camera viewfinder window 340 is now centered on the user's face. The user can toggle through various style options for the camera sticker. Each style may be associated with a particular frame, a particular zoom level, a particular crop level, a particular centering and/or placement scheme, or any combination thereof.

Figure 3F:
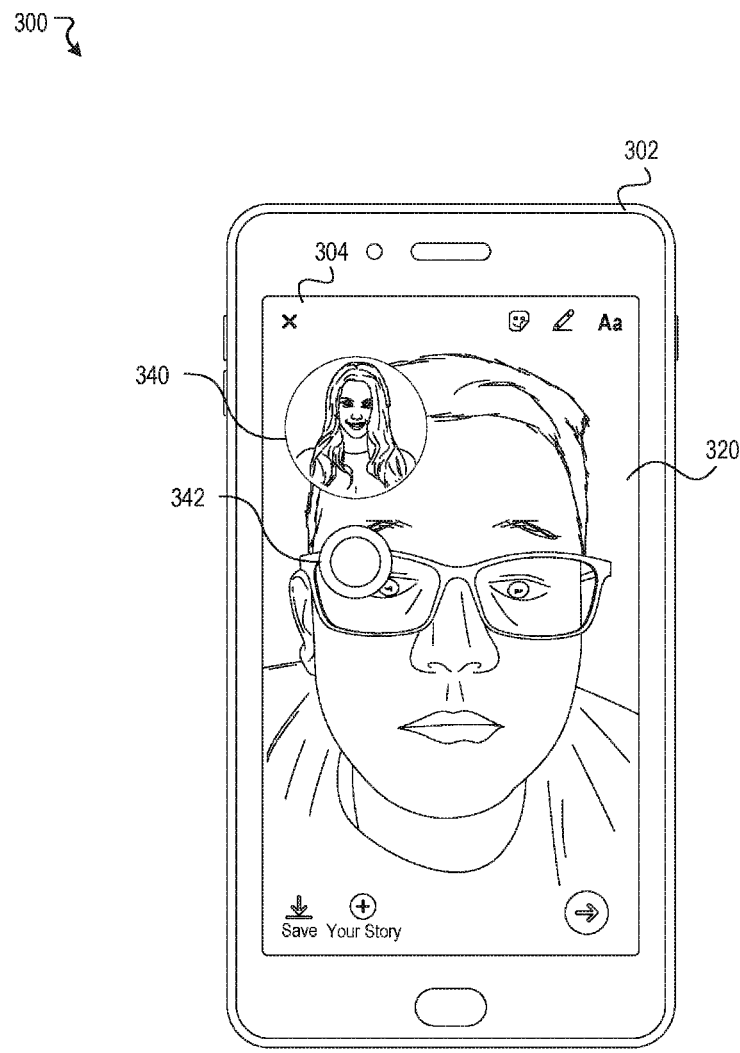
Figure 3G:
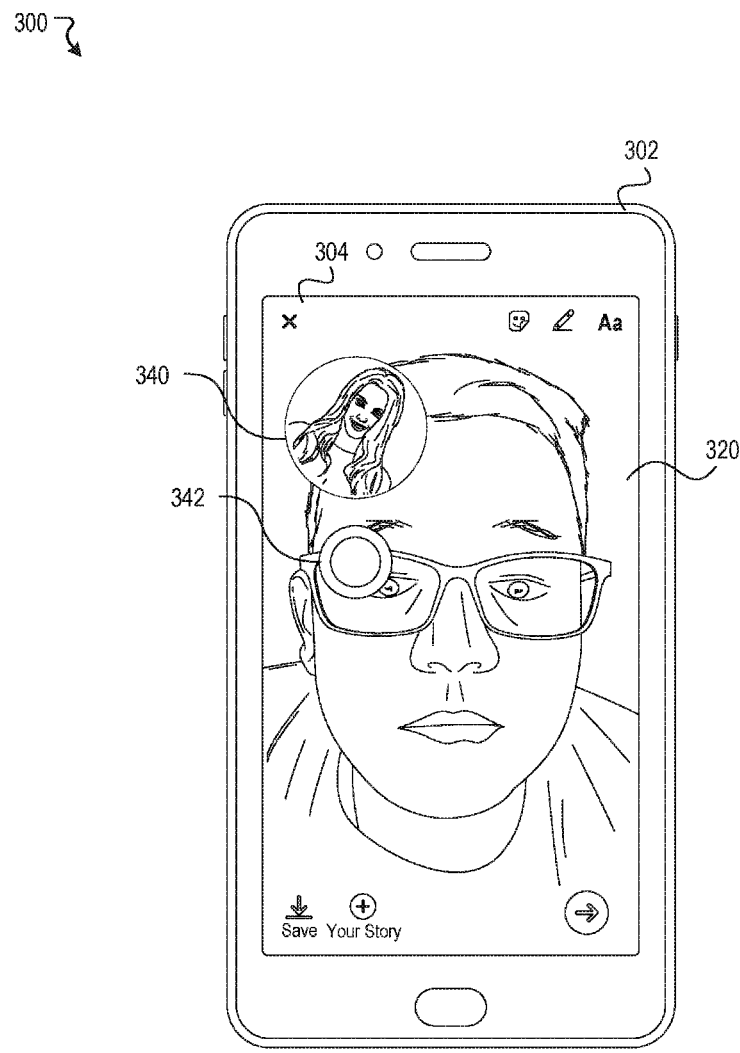
Figure 3H:
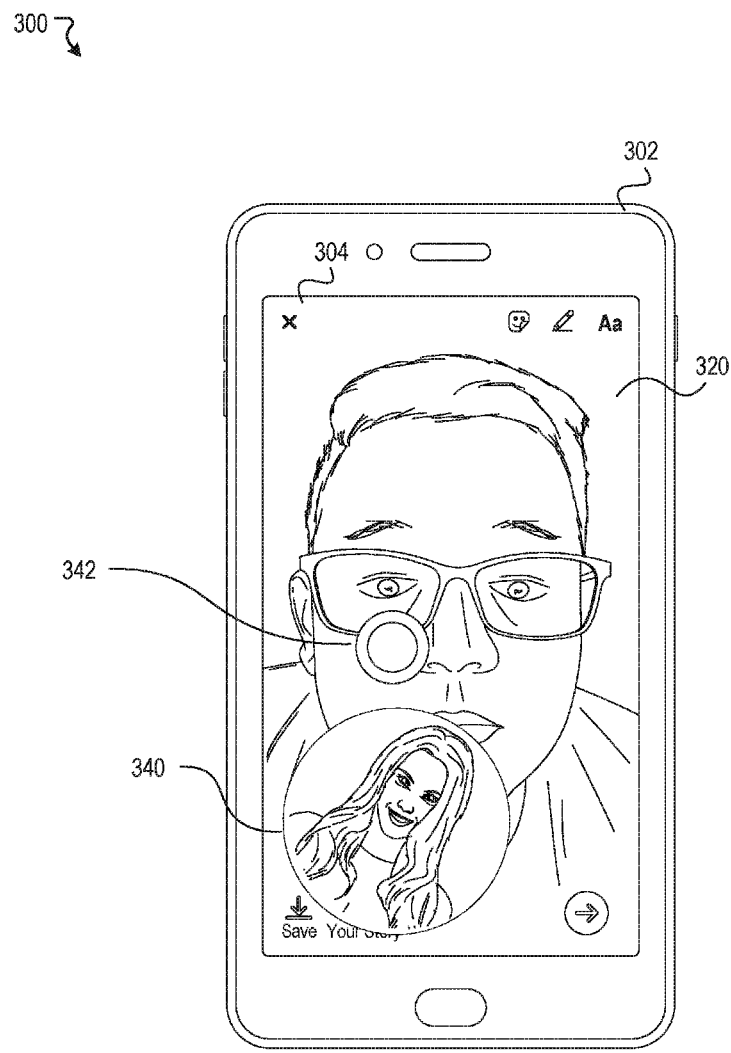

As discussed above, the user can also modify and/or interact with the camera sticker in various other ways. For example, in FIG. 3F, the user has provided a user input (e.g., a dragging gesture) to drag the camera sticker from a center position to a top left corner position. In FIG. 3G, the user has provided another user input (e.g., a two-finger rotating gesture) to rotate the camera sticker. In FIG. 3H, the user has provided another user input (e.g., a pinching or spreading gesture) to change the size of the camera sticker. The user has also moved the camera sticker to another position. It should be understood that as the user is performing these gestures, the camera viewfinder window 340 continues to provide image content reflective of subject matter at which the camera of the computing device 302 is directed. The camera viewfinder 340 will continue to provide this image data until the user selects the shutter button 342 to capture and lock-in an image for the camera sticker. Furthermore, in various embodiments, at least some of the various interactions and modifications described above with respect to the camera sticker and/or the camera viewfinder window 340 can be performed before or after capture of the image using the shutter button 342. In the examples above, the user is performing modifications to the camera viewfinder window 340, which, essentially, provides a preview of what a captured camera sticker will look like once the shutter button 342 is pressed. However, these modifications could also be performed on a captured camera sticker after capture of the camera sticker.

Figure 3I:
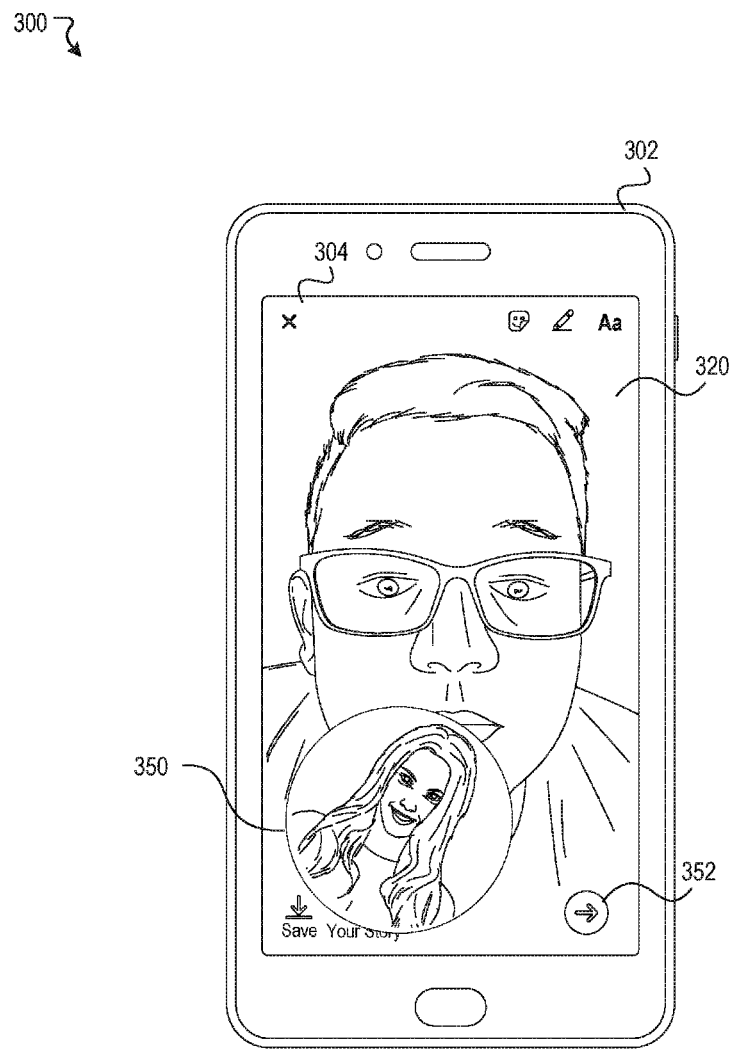

In FIG. 3I, the user has selected the shutter button 342 to capture an image for a camera sticker. In FIG. 3I, the shutter button 342 has disappeared, and the camera viewfinder 342 is no longer presented. Rather, what is shown is a captured camera sticker 350 overlaid on the primary content item 320. In certain embodiments, the captured camera sticker 350 may automatically be added to the user's collection of stickers (e.g., to a sticker tray associated with the user). For example, the captured camera sticker 350 may be automatically added to a "recent stickers" portion of a sticker tray. In another embodiment, the user may be provided with the option to save the captured camera sticker 350 to his or her collection of contextual content items.

The user can select an arrow icon 352 to proceed with publishing the embellished content item that comprises the primary content item 320 and the camera sticker 350. Before publishing the embellished content item, the user can choose to make further modifications to the embellished content item by, for example, adding more stickers, adding a text overlay, or drawing on the media content item, etc.

Figure 4A:
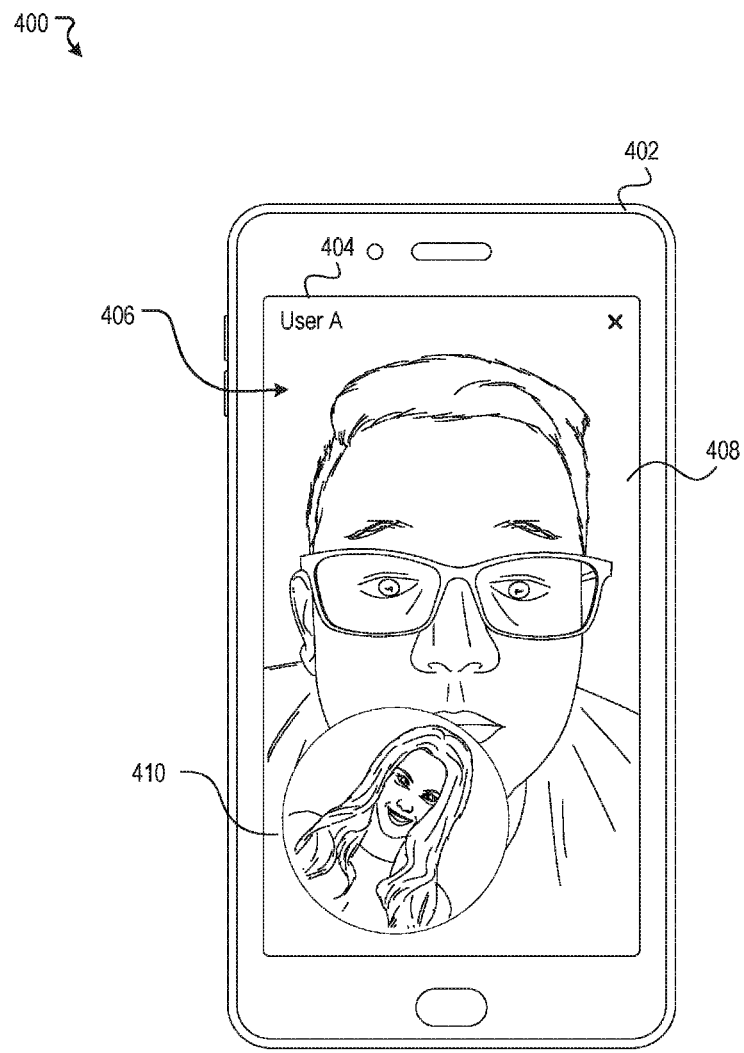
FIGS. 4A-4C illustrate example user interfaces associated with distributing and/or acquiring content items, according to an embodiment of the present disclosure.

FIG. 4A illustrates an example scenario 400 associated with distributing contextual content items, according to an embodiment of the present disclosure. The example scenario 400 includes an interface 404 that is presented through a display screen of a computing device 402. In various embodiments, the interface 404 may be provided through an application (e.g., a web browser, a social networking application, messenger application, etc.) running on the computing device 302 that is configured to interact with a social networking system.

Figure 4B:
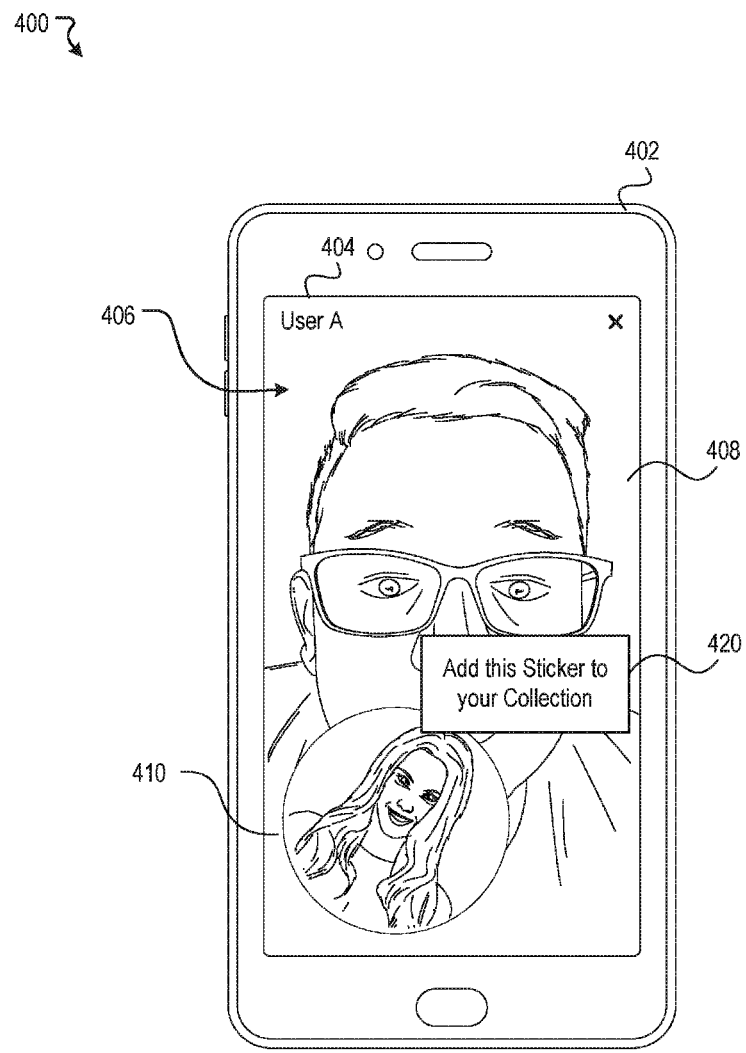

In FIG. 4A, the interface 404 displays an embellished content item 406 published by a user, User A. It can be seen that the embellished content item 406 is the embellished content item that was created by a user in the example scenario 300 of FIGS. 3A-3I. The embellished content item 406 includes a primary content item 408 (an image of a male user's face) and a contextual content item 410 (a sticker of a female user's face) applied to the primary content item. In certain instances, the contextual content item 410 may have been created by the publishing user, User A. In other instances, the contextual content item 410 may have been created by another user, and then subsequently acquired and utilized by User A. A viewing user viewing the embellished content item 406, User B, may wish to also acquire (e.g., receive access to) the contextual content item 410. In FIG. 4B, the viewing user, User B, has selected (e.g., tapped on) the contextual content item 410. As a result, the viewing user, User B, is presented with an option 420 to gain access to the contextual content item 410. The option 420 reads "Add this Sticker to your Collection." The viewing user, User B, can select the option 420 to add the contextual content item 410 to his or her collection.

Figure 4C:
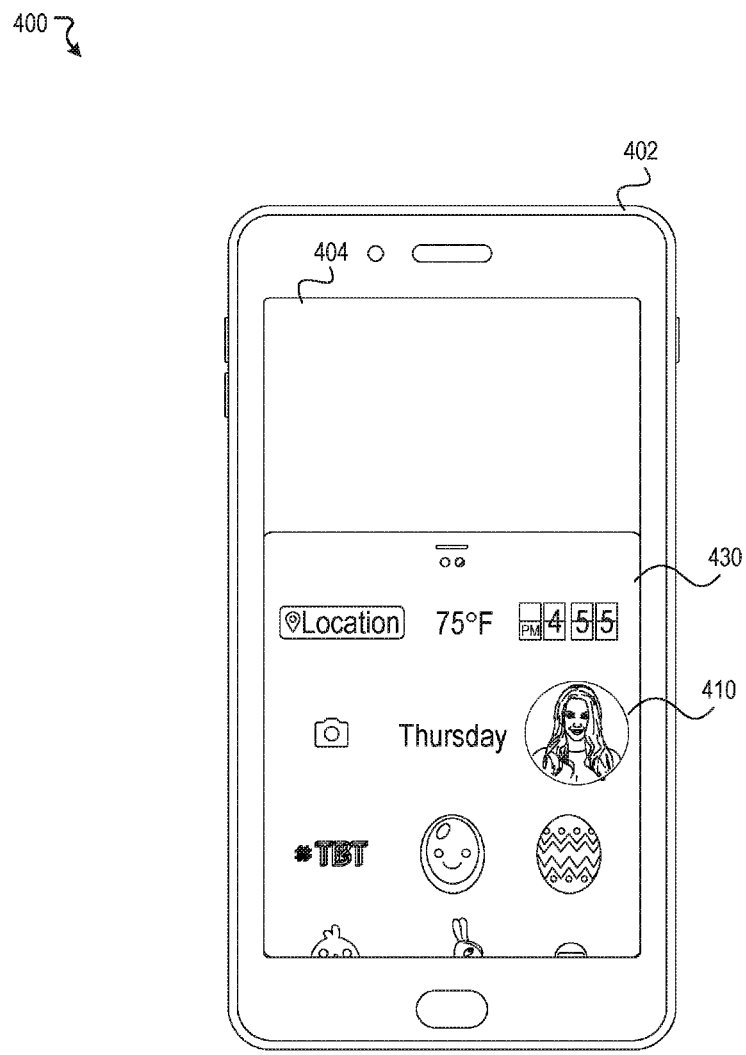

In FIG. 4C, it is shown that the viewing user, User B, has selected the option 420, and the contextual content item 410 now appears in a sticker tray 430 associated with the viewing user, User B, along with a plurality of other stickers. The viewing user, User B, can now use the contextual content item 410 to modify one or more primary content items, for example, within a content modification interface.

Figure 5:
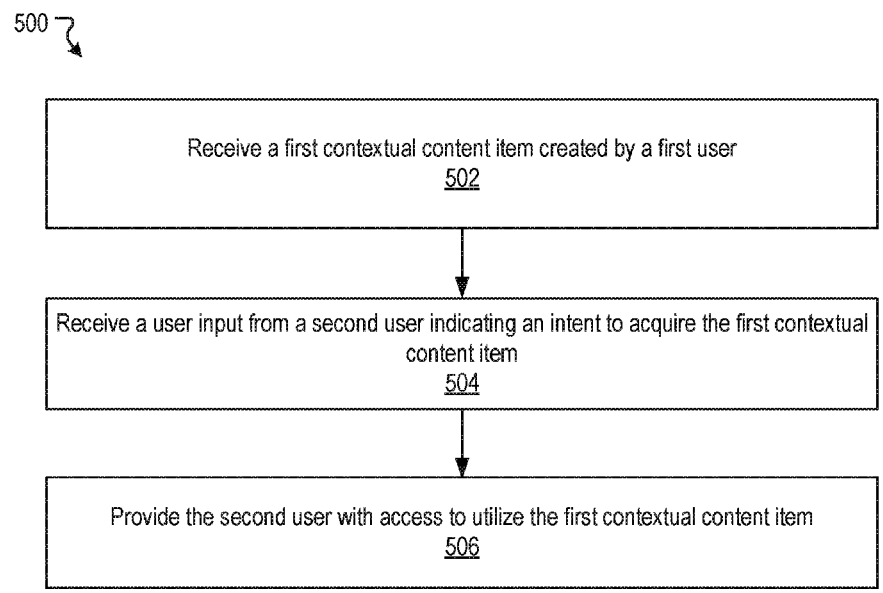
FIG. 5 illustrates an example method associated with distributing contextual content items, according to an embodiment of the present disclosure.

FIG. 5 illustrates an example method 500 associated with distributing contextual content items, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a first contextual content item created by a first user. At block 504, the example method 500 can receive a user input from a second user indicating an intent to acquire the first contextual content item. At block 506, the example method 500 can provide the second user with access to utilize the first contextual content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
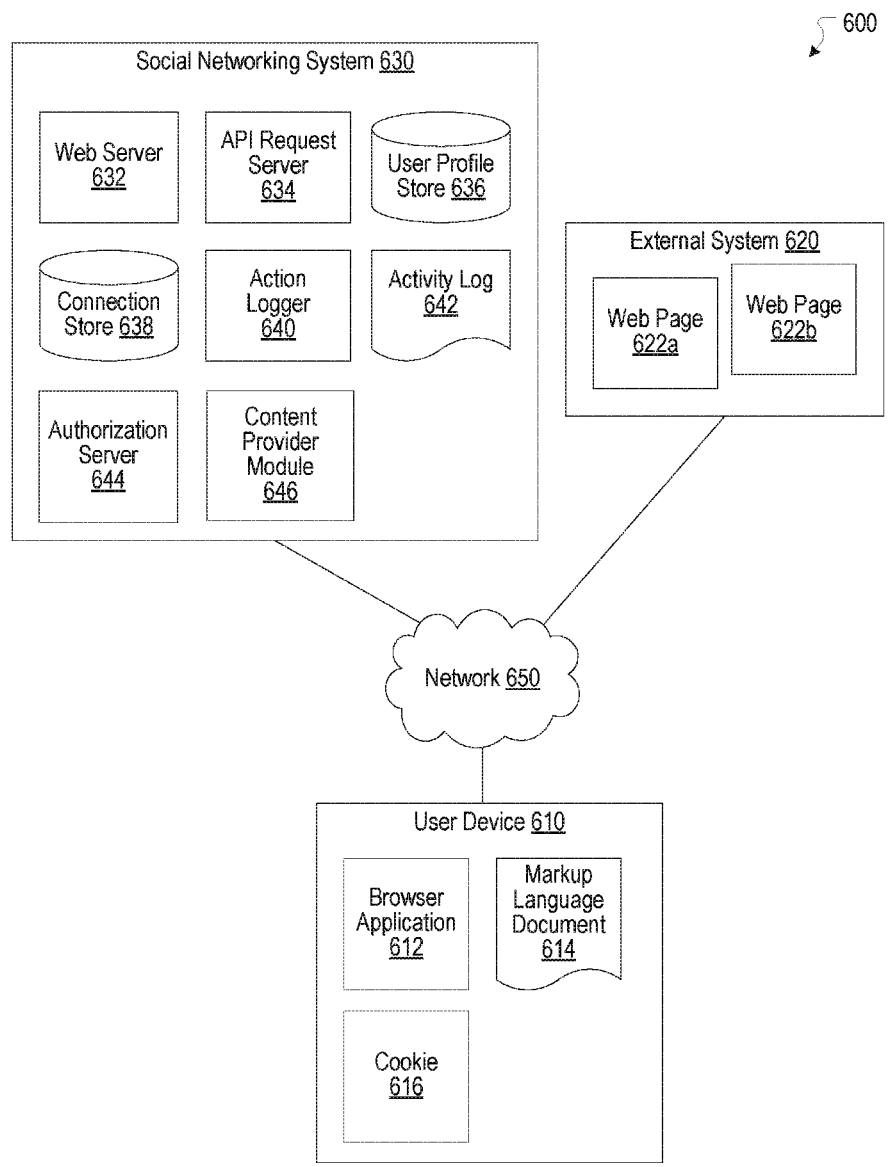
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. As discussed previously, it should be appreciated that there can be many variations or other possibilities.

Hardware Implementation

Figure 7:
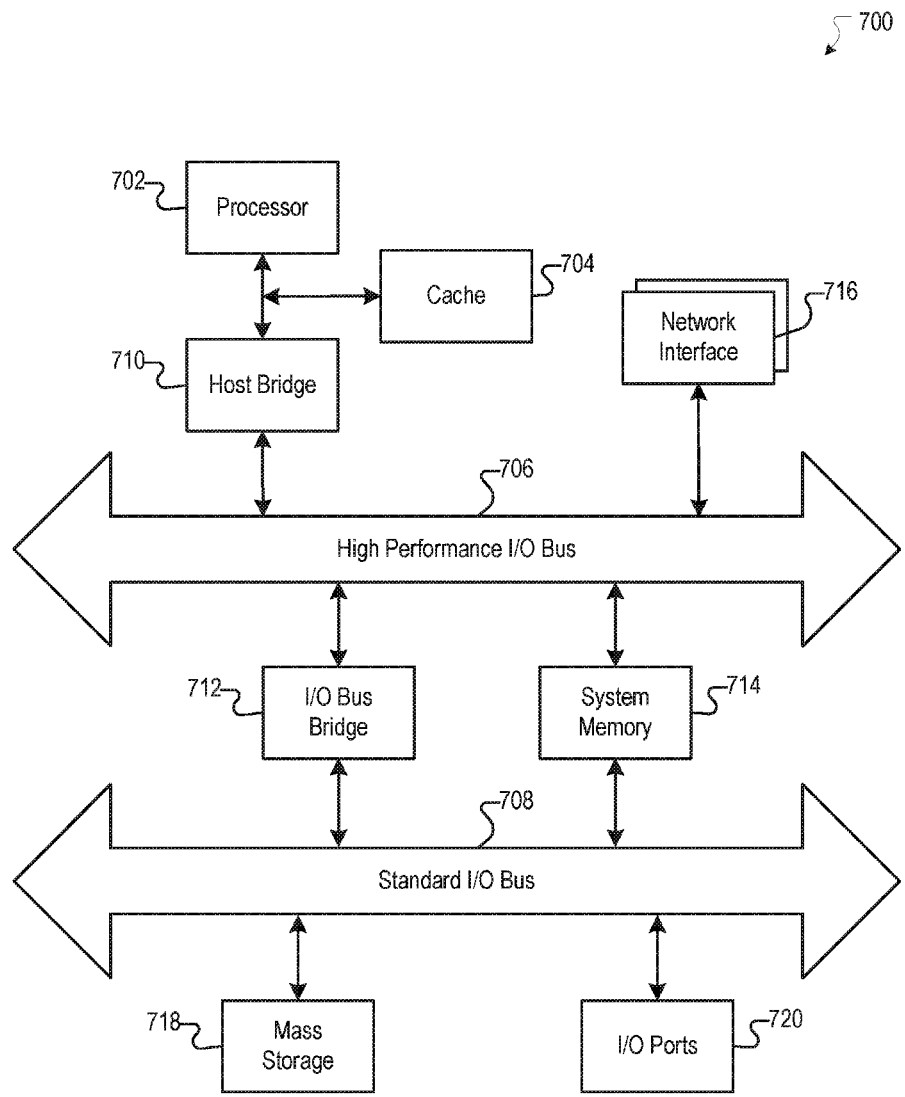
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, a permission setting associated with a first user account, the permission setting specifying a subset of one or more user accounts associated with the first user account that are permitted to access a contextual content item;
receiving, by the computing system and from a computing device associated with the first user account, a primary content item comprising a first image captured by the computing device;
providing, by the computing system and to the computing device associated with the first user account, an instruction to display a camera capture interface overlaying the primary content item on a display of the computing device, wherein the camera capture interface is configured to overlay preview images displayed in one of a plurality of styles, each style having a display setting, the plurality of styles associated with the first user account, the camera capture interface further configured to enable selection of a style applied to the preview images;
receiving, by the computing system and from the computing device associated with the first user account, the contextual content item comprising a second image having a selected style captured by the camera of the computing device via the camera capture interface, the second image being a different image than the first image;
generating, by the computing system, an embellished content item by overlaying the contextual content item on the primary content item, wherein the contextual content item is presented in the embellished content item in the selected style;
providing, by the computing system, the embellished content item in a content feed of a second user account;
receiving, by the computing system, a request from the second user account to acquire the contextual content item;
determining, by the computing system, that the second user account is included in the subset of the one or more user accounts; and
providing, by the computing system, the second user account with access to acquire the contextual content item based on the second user account being in the subset of the one or more user accounts that are permitted to access the contextual content item.

2. The computer-implemented method of claim 1, wherein receiving the request from the second user account occurs during presentation of the embellished content item to the second user account in the content feed.

3. The computer-implemented method of claim 1, wherein providing the second user account with access to acquire the contextual content item comprises adding the contextual content item to a set of contextual content items associated with the second user account.

4. The computer-implemented method of claim 3, wherein providing the second user account with access to acquire the contextual content item further comprises adding the contextual content item to a sticker tray associated with the second user account.

5. The computer-implemented method of claim 1, further comprising receiving a selection of a second primary content item from the second user account.

6. The computer-implemented method of claim 5, wherein the selection is a first selection, the method further comprising receiving a second selection from the second user account of the contextual content item from a plurality of contextual content items.

7. The computer-implemented method of claim 6, further comprising generating a second embellished content item by overlaying the contextual content item on the second primary content item based on the selection of the contextual content item from the plurality of contextual content items.

8. The computer-implemented method of claim 1, further comprising:
providing a search platform to the second user account;
receiving a search input from the second user account; and
providing one or more contextual content items associated with the search input to the second user account.

9. The computer-implemented method of claim 8, further comprising:

determining that the search input corresponds to an identification of a third user account,
wherein the one or more contextual content items provided to the second user account are based on the third user account creating the one or more contextual content items.

10. A system comprising:
at least one processor; and
a memory storing instructions that, when executed by the at least one processor, cause the system to perform operations comprising:
receiving a permission setting associated with a first user account, the permission setting specifying a subset of one or more user accounts associated with the first user account that are permitted to access a contextual content item;
receiving, from a computing device associated with the first user account, a primary content item comprising a first image captured by the computing device;
providing, to the computing device associated with the first user account, an instruction to display a camera capture interface overlaying the primary content item on a display of the computing device, wherein the camera capture interface is configured to overlay preview images displayed in one of a plurality of styles, each style having a display setting, the plurality of styles associated with the first user account, the camera capture interface further configured to enable selection of a style applied to the preview images;
receiving, from the computing device associated with the first user account, the contextual content item comprising a second image having a selected style captured by the camera of the computing device via the camera capture interface, the second image being a different image than the first image;
generating an embellished content item by overlaying the contextual content item on the primary content item, wherein the contextual content item is presented in the embellished content item in the selected style;
providing the embellished content item in a content feed of a second user account;
receiving a request from the second user account to acquire the contextual content item;
determining that the second user account is included in the subset of the one or more user accounts; and
providing the second user account with access to acquire the contextual content item based on the second user account being in the subset of the one or more user accounts that are permitted to access the contextual content item.

11. The system of claim 10, wherein receiving the request from the second user account occurs during presentation of the embellished content item to the second user account in the content feed.

12. The system of claim 10, wherein providing the second user account with access to acquire the contextual content item comprises adding the contextual content item to a set of contextual content items associated with the second user account.

13. The system of claim 12, the operations further comprising:
providing a search platform to the second user account;
receiving a search input from the second user account; and
providing one or more contextual content items associated with the search input to the second user account.

14. The system of claim 13, the operations further comprising:
determining that the search input corresponds to an identification of a third user account,
wherein the one or more contextual content items provided to the second user account are based on the third user account creating the one or more contextual content items.

15. A non-transitory computer-readable storage medium including instructions that, when executed by at least one processor of a computing system, cause the computing system to perform operations comprising:
receiving a permission setting associated with a first user account, the permission setting specifying a subset of one or more user accounts associated with the first user account that are permitted to access a contextual content item;
receiving, from a computing device associated with the first user account, a primary content item comprising a first image captured by the computing device;
providing, to the computing device associated with the first user account, an instruction to display a camera capture interface overlaying the primary content item on a display of the computing device, wherein the camera capture interface is configured to overlay preview images displayed in one of a plurality of styles, each style having a display setting, the plurality of styles associated with the first user account, the camera capture interface further configured to enable selection of a style applied to the preview images;
receiving, from the computing device associated with the first user account, the contextual content item comprising a second image having a selected style captured by the camera of the computing device via the camera capture interface, the second image being a different image than the first image;
generating an embellished content item by overlaying the contextual content item on the primary content item, wherein the contextual content item is presented in the embellished content item in the selected style;
providing the embellished content item in a content feed of a second user account;
receiving a request from the second user account to acquire the contextual content item;
determining that the second user account is included in the subset of the one or more user accounts; and
providing the second user account with access to acquire the contextual content item based on the second user account being in the subset of the one or more user accounts that are permitted to access the contextual content item.

16. The non-transitory computer-readable storage medium of claim 15, wherein receiving the request from the second user account occurs during presentation of the embellished content item to the second user account in the content feed.

17. The non-transitory computer-readable storage medium of claim 15, wherein providing the second user account with access to acquire the contextual content item comprises adding the contextual content item to a set of contextual content items associated with the second user account.

18. The non-transitory computer-readable storage medium of claim 15, the operations further comprising:
providing a search platform to the second user account;

receiving a search input from the second user account; and providing one or more contextual content items associated with the search input to the second user account can perform a search for contextual content items.

19. The non-transitory computer-readable storage medium of claim 18, the operations further comprising:

determining that the search input corresponds to an identification of a third user account, wherein the one or more contextual content items provided to the second user account are based on the third user account creating the one or more contextual content items.

20. The non-transitory computer-readable storage medium of claim 15, wherein the instruction to display the camera capture interface is a first instruction and the camera is a rear-facing camera of the computing device, the operations further comprising:

providing, to the computing device associated with the first user account, a second instruction to display a camera selection toggle that, when selected, causes the computing device to switch between the rear-facing camera to a front-facing camera, wherein the second image is captured by the front-facing camera.

* * * * *